June 28, 1949.                C. D. WEBB                    2,474,643
            METHOD OF BRAZING CEMENTED CARBIDES TO STEEL
                        Filed June 4, 1947

INVENTOR.
Clarence D. Webb
BY
Barnes, Kisselle, Laughlin & Raisch
ATTORNEYS

Patented June 28, 1949

2,474,643

UNITED STATES PATENT OFFICE 2,474,643

METHOD OF BRAZING CEMENTED CARBIDES TO STEEL

Clarence D. Webb, St. Clair Shores, Mich., assignor to Carboloy Company, Inc., a corporation of New York Application June 4, 1947, Serial No. 752,469

9 Claims. (Cl. 76—101)

This invention relates to a method of brazing cemented tungsten carbide to steel.

In the manufacture of cemented carbide tools it is common practice to mount the cemented carbide cutting tip upon a steel shank. By cemented carbide, I refer generally to a hard, compact sintered composition comprising essentially powdered tungsten carbide and a binder of a powdered iron group metal, usually nickel or cobalt. Sometimes this composition also contains as a minor constituent tantalum carbide and titanium carbide or both. In brazing the cemented carbide tip to the steel shank there is placed on the bottom of the recess in the steel shank which is to receive the tip, first a strip of silver base solder about .005" thick, a strip of copper .010" thick, and then two strips of silver base solder each .005" thick, and then upon these four strips is placed the cemented carbide tip. Each strip will have substantially the same width as the cemented carbide tip but will be slightly longer. The recess and the tip will be fluxed and the entire assembly then brought up to brazing temperature at which the brazing material will melt and braze the tip to the shank. In this conventional or standard method of brazing, brazing material inevitably spills out of the recess and runs down on the end of the shank. Before the tool can be used, this brazing material must be ground off. Sometimes this excess brazing material is not completely ground off and consequently, during the grinding of the cemented carbide tip by means of a diamond impregnated dressing wheel, the brazing medium loads up and fouls the diamond wheel.

It is an object of this invention to produce a new method of brazing which will obviate any overflowing of the brazing material from out of the recess on to the end and sides of the shank thereby saving considerable labor and increasing the life of the diamond impregnated dressing wheels.

It is also an object of this invention to simplify and expedite the standard method of brazing and this is accomplished by reducing the number of pieces which must be handled preparatory to the brazing operation.

In the standard method of brazing above described, it has been found impossible to decrease the number of silver base solder strips to less than three. If the silver base solder strips are reduced to two in number, one on each side of the copper strip, then the silver base solder at brazing temperatures will not run up around the back edge of the tip and thus an incomplete braze or bond between the tip and steel shank will result. When a third strip of silver base solder is added, as above described, a complete braze or bond between the tip and shank will be effected. I know of no explanation for this unusual phenomena.

It is another object of my invention to reduce the number of silver base solder strips required to two in number and at the same time achieve a complete and thorough braze or bond between the tip and the shank. I accomplish this object by utilizing a tri-metal strip of brazing material.

Figure 1:
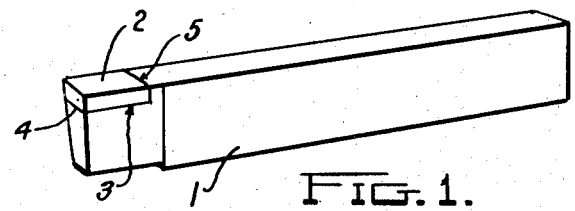
Fig. 1 shows a cemented carbide tool with the cemented carbide tip brazed on to the steel shank by my new method.
Figure 2:
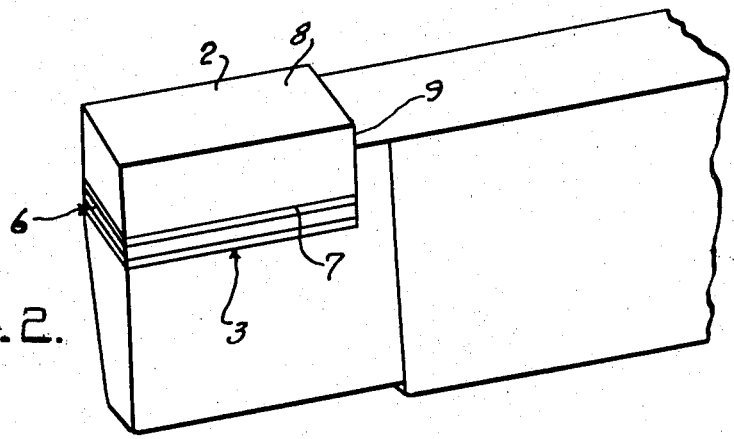
Fig. 2 shows the tip and tri-metal brazing strip in position on the shank preparatory to the brazing operation.
Figure 3:
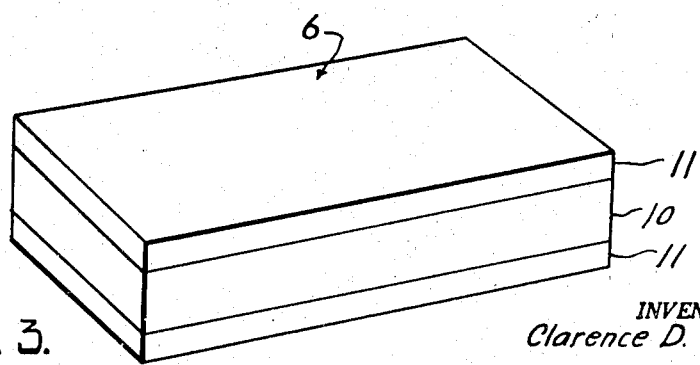
Fig. 3 is an enlarged perspective view showing my tri-metal strip of brazing material.

Referring more particularly to the drawings, I have shown a conventional cemented carbide cutting tool comprising a steel shank 1 and a cemented carbide tip 2. Shank 1 is provided with a recess 3 which, in this instance, has a bottom face 4 and a side face 5. Tip 2 is brazed or bonded to steel shank 1 throughout faces 4 and 5 by my new method which I will now describe.

I form a long strip of tri-metal by bonding or coating both sides of a lamination or center strip of copper .010" thick with a coating or lamination of a silver base solder .005" thick. The silver base solder which I prefer to use consists of substantially the following analysis: 50% silver, 15.5% copper, 16.5% zinc, and 18% cadmium. From this long strip of tri-metal I blank out a shim, generally designated 6, to substantially the size and shape of the base 7 of the tip 2 to be brazed. In this instance the base 7 is of the same size and contour as the top face 8 of the tip. The size of the tri-metal shim will equal the largest face of the tip 2 which is to be bonded to the recess 3 of the shank. In this case the bottom face 7 of tip 2 is larger than the side face 9 of tip 2 and consequently the tri-metal shim 6 will be positioned between bottom face 7 and the bottom of recess 3 and the size of bottom face 3 will determine the size of shim 6. By blanking the shim 6 out of a longer strip of tri-metal brazing material I eliminate the hand operation of cutting the brazed material to the size desired which hand cutting is now standard practice. In the hand cutting of the brazed material to size there is a tendency to cut the brazed material slightly larger than the tip and this is wasteful of brazing material.

The tri-metal shim 6 which has been cut from the strip comprises the center lamination 10 of copper and the outer laminations 11 of silver base solder bonded to the top and bottom faces of copper strip 10.

Since silver base strips 11 are each .005" thick, their total thickness is .010". In the standard procedure now followed, the three silver base solder strips are each .005" thick or a total of .015". Thus, by my new method I save 33⅓% of the silver base solder over that used in the conventional brazing method and this saving of silver solder may reach as high as 45% because I reprocess the scrap from my blanking operation. In addition I have found that the brazing material is preferably blanked to a size slightly smaller than the tip itself.

In the brazing operation I first flux recess 3, insert tri-metal shim 6 on the base of recess 3 and then position cemented carbide tip on top of shim 6 and then subject the complete assembly of shank, shim and tip to a temperature slightly above the melting point of the silver base solder, for example, between 1200° F. and 1500° F. but well below the melting point of copper. The heat for brazing may be obtained by an oxyacetylene flame, induction heating or hydrogen furnace heating. During the heating of the assembly to the brazing temperature the silver solder will flow by capillary action up the side wall of recess 3 and completely bond the bottom face 7 and side face 9 of tip 2 to the bottom and side wall 4 and 5 of recess 3. No solder material will flow out of, or spill over, the edges of recess 3. The copper strip 10 between the carbide tip and shank partially absorbs the strains that result upon cooling down from the brazing temperature to room temperature due to the difference in the rates of contraction of cemented carbide and steel. This copper strip also acts as a cushion between the tip 2 and shank 1 for absorbing a portion of the shock developed in the cutting operation, said shock being most prevalent in interrupted cutting operations.

Tips secured by my new method show higher strengths in shear than those brazed by standard procedure above described. The increased strength varies with different designs of tools but generally the increase is approximately 2000 pounds per square inch, or about a 10% increase.

The advantages of my improved method may be summarized as follows:

1. Amount of braze media is reduced by a minimum of 33⅓%.
2. Tri-metal strip readily lends itself to blanking to any desired size or shape at high speeds, with resulting labor saving.
3. Preparation time required per tool is reduced to a minimum, as only three pieces are required, namely, shank, tri-metal shim, and carbide tip.
4. Time required to remove excess brazing media is completely eliminated, since tri-metal strip permits control of excess and still flows up around the carbide tip.
5. Strength of braze is improved by the use of the new single piece tri-metal shim.
6. Excess braze media is kept off the diamond wheels, thus increasing their life and reducing grinding costs.

I claim:

1. A method for brazing a cemented tungsten carbide body to a ferrous support comprising the steps of placing the cemented carbide body and a trimetal shim of two outer laminations of a silver base solder and an intermediate lamination of copper, upon the support with the shim between the support and the body and then heating the assembled body, shim and support to a temperature above the melting point of the silver base alloy and below the melting point of copper to bond the assembly together.

2. The method as set forth in claim 1 wherein the shim has substantially the same area as the face of the cemented carbide body which rests upon the shim.

3. The method set forth in claim 1 wherein the outer laminations of the shim have a composition consisting of about fifty percent (50%) silver and the balance copper, zinc and cadmium in about equal proportions and wherein the assembled body, shim and support are heated to a temperature falling within a range of from 1200° F. to 1500° F. to bond the assembly together.

4. The method set forth in claim 3 wherein the outer laminations of the shim are each about .005 inch thick and the copper lamination is about .010 inch thick.

5. A method for brazing a cemented tungsten carbide body to a ferrous support comprising the steps of coating a strip of copper on each side with a silver base solder, blanking a shim out of the thus coated copper strip to a size substantially the same as a face of the carbide body, then assembling the body, shim and support together with the shim positioned between the support and the said face of the carbide body, and then heating the assembled body, shim and support to a temperature falling within a range of from 1200° F. to 1500° F. which is above the melting point of the silver base alloy and below the melting point of copper to thereby bond the carbide body, shim and support together.

6. The method set forth in claim 5 wherein the copper strip has a thickness of about .010 inch and the silver base solder coating has a thickness of about .005 inch.

7. A method for brazing a plurality of faces of a cemented tungsten carbide body to the faces of a recess in a ferrous support comprising the steps of placing the cemented carbide body and a trimetal shim of two outer laminations of a silver base solder and an intermediate lamination of copper, upon the support with the shim between the largest of said faces of the recess in the support and the largest of said faces of the said body and then heating the assembled body, shim and support to a temperature falling within a range of from 1200° F. to 1500° F. which is above the melting point of the silver base alloy and below the melting point of copper to bond the said faces of said recess to the said faces of said body.

8. The method as set forth in claim 7 wherein the said shim has substantially the same area as the largest of said faces of said body.

9. The method as claimed in claim 8 wherein the said two laminations of silver solder is the only solder bonding the assembly together.

CLARENCE D. WEBB.

REFERENCES CITED

The following references are of record in the file of this patent:

UNITED STATES PATENTS

| Number | Name | Date |
|---|---|---|
| 1,887,373 | Emmons et al. | Nov. 8, 1932 |

(Other references on following page)

UNITED STATES PATENTS

| Number | Name | Date |
|---|---|---|
| 1,903,077 | Wolf | Mar. 28, 1933 |
| 1,951,856 | Balke | Mar. 20, 1934 |
| 1,956,233 | Braun | Apr. 24, 1934 |
| 1,964,972 | Binns | July 3, 1934 |
| 2,124,438 | Struk et al. | July 19, 1938 |
| 2,232,176 | Guthrie | Feb. 18, 1941 |
| 2,384,204 | St. Clair | Sept. 4, 1945 |

FOREIGN PATENTS

| Number | Country | Date |
|---|---|---|
| 345,171 | Great Britain | Mar. 19, 1931 |
| 713,475 | France | Oct. 28, 1931 |

OTHER REFERENCES

"Carbide Tools Tipped by Induction Brazing," American Machinist, Oct. 14, 1943, pages 106 and 107.